(12) United States Patent  (10) Patent No.: US 8,724,500 B2
Gu et al.  (45) Date of Patent: May 13, 2014

(54) METHOD, APPARATUS, AND SYSTEM OF DUPLICATE ADDRESS DETECTION PROXY

(75) Inventors: Dujuan Gu, Beijing (CN); Hongyu Li, Shenzhen (CN); Ruobin Zheng, Shenzhen (CN); Yizhou Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 13/472,978

(22) Filed: May 16, 2012

(65) Prior Publication Data

US 2012/0224576 A1  Sep. 6, 2012

Related U.S. Application Data

(63) Continuation of application No. PCT/CN2009/074984, filed on Nov. 17, 2009.

(51) Int. Cl.
*H04L 1/00* (2006.01)

(52) U.S. Cl.
USPC ............................. 370/252; 370/329; 709/229

(58) Field of Classification Search
USPC .......... 370/252, 331, 330, 329; 709/225, 226; 455/436
See application file for complete search history.

(56) References Cited

U.S. PATENT DOCUMENTS

| 2005/0036471 | A1 | 2/2005 | Singh et al. | |
| 2010/0316079 | A1* | 12/2010 | Chang-Hasnain et al. | 372/45.01 |
| 2011/0004674 | A1 | 1/2011 | Zheng | |

FOREIGN PATENT DOCUMENTS

| CN | 1901551 | 1/2007 |
| CN | 1901551 A | 1/2007 |
| CN | 1980252 | 6/2007 |
| CN | 101110712 | 1/2008 |
| CN | 101547223 | 9/2009 |
| JP | 2009-253962 A | 10/2009 |

OTHER PUBLICATIONS

Notice of Reasons for Rejection dated Jul. 23, 2013 in connection with Japanese Patent Application No. 2012-539157.
Supplementary European Search Report dated Oct. 9, 2012 in connection with European Patent Application No. EP 09 85 1363.
H. Li, et al., "Line identification in IPv6 Neighbour Solicitation messages", Huawei Technologies, IPv6 Maintenance WG, Jul. 6, 2009, 11 pages.
S. Thomson, et al., "IPv6 Stateless Address Autoconfiguration", Network Working Group, Sep. 2007, 30 pages.
T. Narten, et al., "Neighbor Discovery for IP version 6 (IPv6)", Network Working Group, Sep. 2007, 97 pages.
Translation of Office Action dated Nov. 5, 2012 in connection with Chinese Patent Application No. 200980148673.9.

(Continued)

*Primary Examiner* — Dady Chery

(57) ABSTRACT

Embodiments of the present invention disclose a method, apparatus, and system of DAD proxy. The method includes: obtaining a DAD-NS message; comparing the obtained DAD-NS message with locally stored DAD information, and adding the DAD-NS information to the locally stored DAD information when it is determined, according to a comparison result, that the IP address to be detected is not duplicate; when it cannot be determined whether the IP address to be detected is duplicate or not, initiating, according to the address information included in the locally stored DAD information after comparison, an unreachability detection to the IP address to be detected to determine whether the IP address to be detected is duplicate. The apparatus includes: an obtaining module, a storing module, and a processing module. The system includes: an apparatus of DAD proxy and an access device.

18 Claims, 3 Drawing Sheets

(56) References Cited

OTHER PUBLICATIONS

PCT International Search Report mailed Aug. 19, 2010, issued in related International Application No. PCT/CN2009/074984, Huawei Technologies Co., Ltd. (3 pages).

PCT Written Opinion of the International Searching Authority mailed Aug. 19, 2010, issued in related International Application No. PCT/CN2009/074984, Huawei Technologies Co., Ltd. (5 pages).

* cited by examiner

METHOD, APPARATUS, AND SYSTEM OF DUPLICATE ADDRESS DETECTION PROXY

CROSS-REFERENCE TO RELATED APPLICATIONS

This application is a continuation of International Application No. PCT/CN2009/074984, filed on Nov. 17, 2009, which is hereby incorporated by reference in its entirety.

FIELD OF THE INVENTION

The present invention relates to the field of communications technologies, and in particular, to a method, apparatus, and system of duplicate address detection proxy.

BACKGROUND OF THE INVENTION

With the development of the Internet, the Internet Protocol version 6 (IPv6) will replace Internet Protocol version 4 (IPv4) and become a next generation Internet Protocol (IP). One prominent feature of the IPv6 is that IPv6 supports automatic configuration of a network node address, which greatly reduces the workload of a network manager. When an address is automatically configured by using IPv6, to prevent the case that two subscribers use the same IP address, duplicate address detection (DAD) must be performed before a subscriber uses an IPv6 unicast address, that is, it should be determined that whether the IPv6 unicast address is used by another subscriber, so as to ensure the uniqueness of the IP address.

To support IPv6, usually a terminal needs to support the DAD function. The digital subscriber line (DSL) is for point to point (P2P) transmission, but not a shared medium, and therefore two DSL terminals may not directly communicate. Terminals on a passive optical network (PON) are isolated. On the N:1 virtual local area network (VLAN), N>2, user ports on a network device are isolated even in the same VLAN, the network device does not forward DAD packets of other subscribers to a subscriber. N:1 VLAN refers to modifying VLAN IDs, which are carried in packets sent from N VLANs, to the same VLAN ID. Therefore, the DAD function in the above scenario is disabled, and consequently the address may not be automatically configured.

The neighbor discovery proxy (ND proxy) is used to forward a DAD multicast packet to implement the DAD function. The specific procedure may refer to FIG. 1, each subscriber is connected to one network, and subscriber 1 sends a DAD-neighbor solicitation (DAD-NS) multicast packet to the ND proxy by using an intermediate Layer 2 access network 1 (AN1). After receiving the packet, port 1 of the ND proxy modifies the link-local address (LLA) and source-media access control (S-MAC) which are contained in the packet, and unconditionally forwards a modified multicast packet to other ports of the ND proxy. For example, after receiving the modified packet, port 2 sends the modified packet to subscriber 2 by using an intermediate Layer 2 AN2.

Although the ND proxy may be used to forward the multicast packet used as a DAD-NS message, the ND proxy unconditionally forwards a received DAD-NS multicast packet to other ports except the port which has received the packet. In practice, only a few subscribers on the ports on the network use duplicate addresses. If the multicast packet is forwarded to all other ports, not only resources are wasted but also a large amount of bandwidth is consumed. In addition, the DAD-NS multicast packet is forwarded to other subscribers so that other subscribers may easily obtain the address and other related information of the subscriber from the packet, which produces security risks. Further, the DAD-NS multicast packet is forwarded to other subscribers by using the ND proxy. Therefore, the delay of the detection is prolonged and the most severe problem is that the DAD fails to be performed over subscribers on the same port of the ND proxy, for example, subscriber 3. In addition, there is a high probability that prefixes on the same port are the same and the addresses are duplicate. Therefore, the DAD function is not correct and the automatic address configuration may not be correctly implemented.

SUMMARY OF THE INVENTION

Embodiments of the present invention provide a method and apparatus of DAD proxy so as to provide a correct DAD proxy function and solve the problems in a network, such as multicast packet flooding, resource wasting, and security issues. The technical solution is as follows:

An embodiment of the present invention provides a method of DAD proxy, where the method includes:

obtaining a DAD-NS message, the DAD-NS message including address information sent by a subscriber and access location information corresponding to the address information, where the address information includes at least an IP address to be detected and a link layer address;

comparing an obtained DAD-NS message with locally stored DAD information, and adding the DAD-NS message to the locally stored DAD information when it is determined, according to a comparison result, that the IP address to be detected is not duplicate; when it cannot be determined whether the IP address to be detected is duplicate or not, initiating, according to the address information included in the locally stored DAD information after comparison, an unreachability detection to the IP address to be detected to determine whether the IP address to be detected is duplicate; where the DAD information includes address information and access location information of at least one subscriber.

An embodiment of the present invention provides an apparatus of DAD proxy, where the apparatus includes: an obtaining module, a storing module, and a processing module.

The obtaining module is configured to obtain a DAD-NS message, where the DAD-NS message includes address information sent by a subscriber and access location information corresponding to the address information, and the address information includes at least an IP address to be detected and a link layer address.

The storing module is configured to store DAD information, the DAD information including address information and access location information of at least one subscriber.

The processing module is configured to compare the obtained DAD-NS message with locally stored DAD information, and add the DAD-NS message to the locally stored DAD information when it is determined, according to the comparison result, that the IP address to be detected is not duplicate; when it cannot be determined whether the IP address to be detected is duplicate or not, initiate, according to the address information included in the locally stored DAD information after comparison, an unreachability detection to the IP address to be detected to determine whether the IP address to be detected is duplicate.

An embodiment of the present invention provides a system of DAD proxy, where the system includes: an apparatus of DAD proxy and an access device.

The apparatus of DAD proxy includes: an obtaining module, a storing module, and a processing module; wherein the obtaining module is configured to obtain a DAD-NS message by using the access device, wherein the DAD-NS message includes address information sent by a subscriber and access location information corresponding to the address information inserted by the access device, and the address information includes at least an IP address to be detected and a link layer address;

the storing module is configured to store DAD information, the DAD information including address information and access location information of at least one subscriber.

the processing module is configured to compare the obtained DAD-NS message with locally stored DAD information, and add the DAD-NS message to the locally stored DAD information when it is determined, according to the comparison result, that the IP address to be detected is not duplicate; when it cannot be determined whether the IP address to be detected is duplicate or not, initiate, according to the address information included in the locally stored DAD information after comparison, an unreachability detection to the IP address to be detected to determine whether the IP address to be detected is duplicate.

The Processing Module Includes:

a comparing unit, configured to compare the obtained DAD-NS message with the DAD information stored in the storing module;

an unreachability detecting unit, configured to: if the comparison result indicates that the IP address to be detected and the access location information that are included in the DAD-NS message are the same as those included in the DAD information, but the link layer address is different, or if the comparison result obtained by the comparing unit indicates that the IP address to be detected included in the DAD-NS message is the same as that included in the DAD information stored in the storing module, but the access location information and the link layer address are different, or if the comparison result obtained by the comparing unit indicates that the link layer address and the IP address to be detected that are included in the DAD-NS message are the same as those included in the DAD information stored in the storing module, initiate, according to the address information included in the locally stored DAD information after comparison, the unreachability detection to the IP address to be detected; if the unreachability detection succeeds, notify a sending unit; if the unreachability detection fails, notify a determining unit.

The sending unit is configured to determine that the IP address to be detected is duplicate after receiving an unreachability detection success message from the unreachability detecting unit, and send a DAD-neighbor advertisement (DAD-NA) message to the subscriber by using the access device.

The determining unit is configured to determine that the IP address to be detected is not duplicate after receiving an unreachability detection failure message from the unreachability detecting unit.

The access device includes: a receiving module, and a determining module, a sending module, and a discarding module; wherein the receiving module is configured to receive the DAD-NA message sent by the sending unit in the processing module of the apparatus of DAD proxy, wherein the DAD-NA message includes an access loop identifier corresponding to the subscriber, the access loop identifier including an access device identifier and a line identifier that are corresponding to the subscriber;

the determining module is configured to determine whether the access loop identifier included in the DAD-NA message received by the receiving module includes the access device identifier of the receiving module; if the access loop identifier included in the DAD-NA message includes the access device identifier of the receiving module, notify the sending module; otherwise, notify the discarding module;

the sending module is configured to send the DAD-NA message to the subscriber according to a line identifier in the access loop identifier; and the discarding module is configured to discard the DAD-NA message.

The beneficial effects of the technical solution provided in the embodiments of the present invention are as follows:

A received DAD-NS message is compared with the locally stored DAD information. When it cannot be determined whether the IP address to be detected is duplicate according to the comparison result, an unreachability detection is initiated, according to the address information included in the locally stored DAD information, to the IP address to be detected to determine whether the IP address to be detected is duplicate. In this manner, the DAD may be performed correctly without forwarding a multicast packet to other subscribers who do not require the DAD detection. This prevents a case where other subscribers obtain the DAD-NA message of the subscriber on whom the DAD is performed. Therefore, the problem related to resource wasting and security that are caused by unconditional multicast forwarding a DAD-NS message is solved.

DETAILED DESCRIPTION OF THE EMBODIMENTS

To make the objective, technical solution, and advantages of the present invention clearer, the following section describes the embodiments of the present invention with reference to the accompanying drawings.

Embodiment 1

Figure 1:
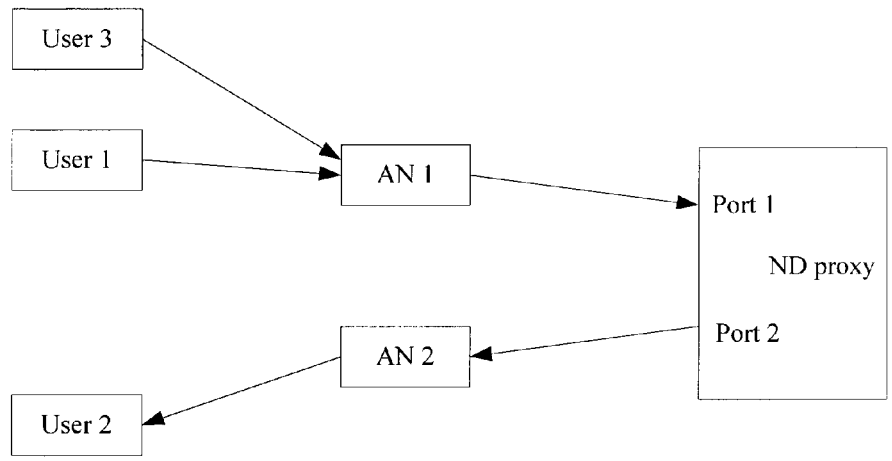
FIG. 1 is a schematic working diagram of an ND proxy in the prior art.
Figure 2:
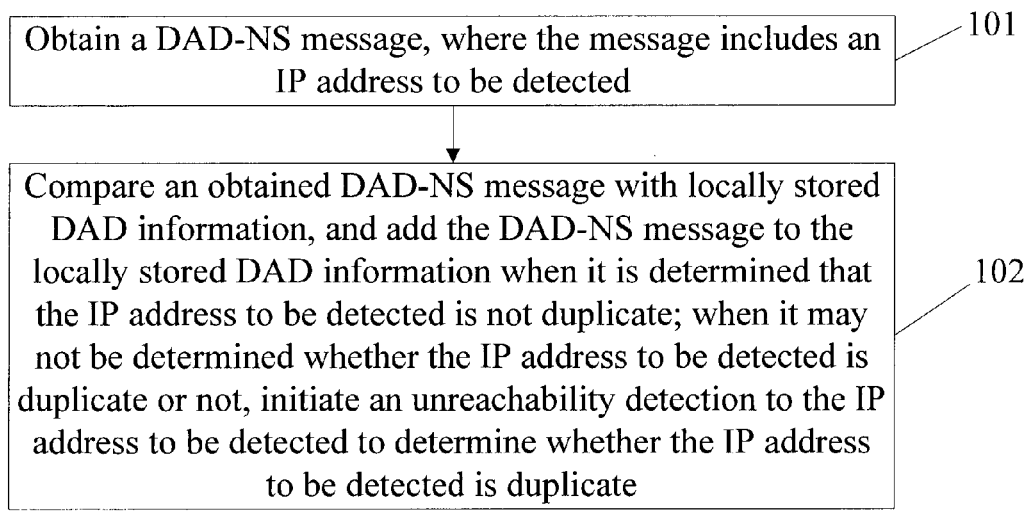
FIG. 2 is a schematic flowchart of a method of DAD proxy according to Embodiment 1 of the present invention.

Referring to FIG. 2, an embodiment of the present invention provides a method of DAD proxy, where the method includes the following steps:

101: Obtain a DAD-NS message, where the message includes address information sent by a subscriber and access location information corresponding to the address information, and the address information includes an IP address to be detected and a link layer address.

For example, the link layer address is a media access control (MAC) address in the Ethernet link, and is the ITU telecommunication standardization sector, (ITU-T) E.164 address in the integrated services digital network (ISDN).

102: Compare an obtained DAD-NS message with locally stored DAD information, and add the DAD-NS message to the locally stored DAD information when it is determined, according to a comparison result, that the IP address to be detected is not duplicate; when it cannot be determined whether the IP address to be detected is duplicate or not, initiate, according to the address information included in the locally stored DAD information after comparison, an unreachability detection to the IP address to be detected to determine whether the IP address to be detected is duplicate.

The obtained DAD-NS message is compared with the locally stored DAD information to determine whether the IP address to be detected is duplicate; therefore, the DAD may be performed correctly without forwarding a multicast packet to other subscribers who do not need the DAD and these subscribers may not obtain the DAD-NA message of the subscriber to be detected. In this manner, the problem related to resource wasting and security that are caused by unconditionally forwarding the DAD-NA message in multicast mode is solved.

Embodiment 2

Figure 3:
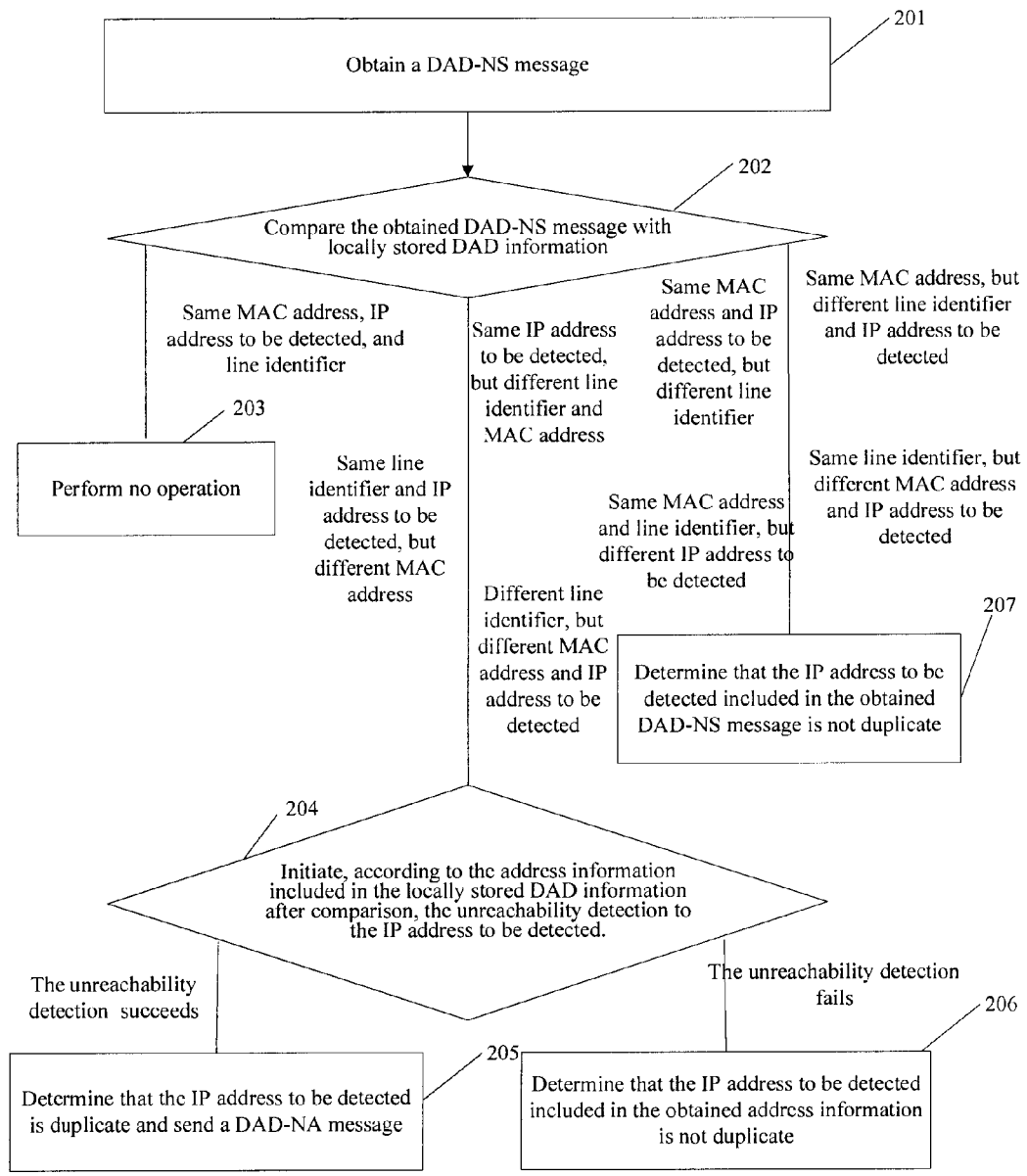
FIG. 3 is a schematic flowchart of a method of DAD proxy according to Embodiment 2 of the present invention.

Referring to FIG. 3, an embodiment of the present invention provides a method of DAD proxy. According to this embodiment, the following section uses a case where the address information sent by a subscriber includes a link layer address and an IP address to be detected as an example for detailed description. However, a case where the address information includes a prefix of the IP address to be detected or other information is also included in this embodiment. If other information is included in the address information, processing is required according to actual conditions, but the processing also falls within the idea of the present invention.

Specifically, when each subscriber on a subscriber network uses an IPv6 unicast address, the subscriber needs to perform the DAD on the IPv6 unicast address to ensure that the IPv6 address is unique. In this embodiment, the IPv6 unicast address is referred to as the IP address to be detected. The IPv6 unicast address may be a link layer address, global unicast address (GUA), or unique local IPv6 address (ULA). In the address information sent by the subscriber, a source address is set to an unassigned one (::), and a target address is set to a multicast address of a request node constructed by the IP address to be detected.

It should be noted that before performing the DAD, the subscriber needs to join two multicast groups, that is, the multicast group addresses of all the nodes and the multicast address of the request node. The former ensures that the subscriber may receive the DAD-NA message sent by the subscriber having used the IP address to be detected, and the latter ensures that the subscriber using the same IP address to be detected may timely detect the existence of a peer.

The method includes the following steps:

201: The DAD Proxy obtains a DAD-NS message, where the message includes address information sent by a subscriber and access location information corresponding to the address information, the address information including an IP address to be detected and a link layer address. In this embodiment, the link layer address may be the MAC address but is not limited to the MAC address.

In this embodiment, a subscriber sending address information may be referred to as the subscriber on whom the DAD is performed.

In this embodiment, the obtained access location information may be sent by a subscriber, or may be directly obtained by the DAD Proxy itself. When a subscriber sends the address information by using an intermediate Layer 2 network, the address information corresponding to the subscriber may be inserted by using the intermediate Layer 2 network.

Specifically, the access location information may be an access loop identifier which includes a line identifier connected to the subscriber.

Specifically, the access loop identifier includes an agent circuit ID and/or agent remote ID defined in Request For Comments (RFC) 3046.

Different types correspond to the access loop identifier may have different line identifier coding formats.

For example, when the type corresponding to the access loop identifier is a DSL, and an access node is a digital subscriber line access multiplexer (DSLAM), the coding format of the line identifier connected to the subscriber is specifically as follows:

{atm|eth}
AccessNodeIdentifier/ANI_rack/ANI_frame/ANI_slot/ANI_subslot/
ANI_port[:ANI_XPI.ANI_XCI]

When the type corresponding to the access loop identifier is a PON, and the access node is an optical network unit (ONU) or optical line terminal (OLT), the coding format of the line identifier of the subscriber connection is as follows:

AccessNodeIdentifier/ANI_rack/ANI_frame/ANI_slot/ANI_subslot/ANI_port/ONU_ID
[ONU_Slot/ONU_Subslot/Port_ID][:{atm/eth|trk}/Port_XPI.Port_XCI]
[LN|EP|GP]

When the type corresponds to the access loop identifier is an Ethernet, and the access node is an Ethernet switch, a broadband subscriber access loop (port) in a local area network (LAN) uses the information coding format of the broadband subscriber access loop (port) in a PON system. The coding format of the line identifier of the subscriber connection is as follows:

AccessNodeIdentifier/ANI_rack/ANI_frame/ANI_slot/ANI_subslot/ANI_port/ONU_ID
ONU_Slot/ONU_Subslot/Port_ID:{atm|eth|trk|hyd}/Port_XPI.Port_XCI
{LN|EP|GP}

After receiving the address information sent by a first subscriber, the DAD proxy stores the address information of the subscriber and the access location information corresponding to the address information as a piece of DAD information. In the address information, the IP address to be detected maps the MAC address. To be specific, the IP address to be detected, the MAC address, and the access location information are bundled as a piece of DAD information. The DAD proxy may store multiple pieces of DAD information, that is, DAD information of multiple subscribers.

202: Compare the obtained DAD-NS message with locally stored DAD information, and determine whether the IP address to be detected is duplicated or not.

If the comparison result indicates that the link layer address, the IP address to be detected, and the access location information that are included in the obtained DAD-NS message are the same as those included in the locally stored DAD information, step 203 is performed; or if the comparison result indicates that the IP address to be detected and the access location information that are included in the obtained DAD-NS message are the same as those included in the DAD information, but the link layer address is different, the IP address to be detected may be duplicated and step 204 is performed; or if the comparison result indicates that the IP address to be detected included in the obtained DAD-NS message is the same as that included in the DAD information, but the access location information and the link layer address are different, it indicates that the IP address to be detected may be duplicated, and step 204 is performed; or if the comparison result indicates that the link layer address and the IP address to be detected that are included in the DAD-NS message are the same as those included in the DAD information, but the access location information is different, it indicates that the subscriber is a nomadic subscriber, and step 204 is performed.

if the comparison result indicates that the link layer address and the access location information that are included in the obtained DAD-NS message are the same as those included in the DAD information, but the IP address to be detected is different, it indicates the subscriber has multiple addresses, and step 207 is performed; or if the comparison result indicates that the access location information included in the obtained DAD-NS message is the same as that included in the locally stored DAD information, but the link layer address and the IP address to be detected are different, it indicates that different subscribers access the network by using the same allocation location, and step 207 is performed; or if the comparison result indicates that the link layer address included in the obtained DAD-NS message is the same as that included in the locally stored DAD information, but the access location information and the IP address to be detected are different, the subscriber may roam to another region and step 207 is performed; or if the comparison result indicates that the access location information, the link layer address, and the IP address to be detected that are included in the obtained DAD-NS message are different from those included in the locally stored DAD information, it indicates that the subscriber is a new subscriber, and step 207 is performed.

203: The same subscriber may perform repeated operations. In this case, no operation is required.

204: Initiate, according to the address information in the locally stored DAD information after comparison, an unreachability detection to the IP address to be detected; if the unreachability detection succeeds, step 205 is performed; if the unreachability detection fails, step 206 is performed.

In this embodiment, the process of the unreachability detection is as follows:

An NA packet is encapsulated in unicast mode by using the IP address to be detected included in the locally stored DAD information after comparison, and then the packet is encapsulated to an IPv6 packet.

The encapsulated IPv6 packet is link-layer encapsulated by using the MAC address corresponding to the IP address to be detected included in the locally stored DAD information after comparison.

The link-layer encapsulated IPv6 packet is sent in unicast mode to the subscriber corresponding to the IP address to be detected, waiting for the subscriber to return an NA packet. If an NA packet is received within a preset time, it indicates that the IP address to be detected is reachable, the unreachability detection succeeds, and step 205 is performed. If no NA packet is received within the preset time, it indicates that the IP address to be detected is unreachable, the unreachability detection fails, and step 206 is performed.

205: Determine that the IP address to be detected included in the obtained address information is duplicate, and send a DAD-NA message to the subscriber on whom the DAD is performed. The DAD-NA message includes the access location information and/or link layer address of the subscriber.

In practice, the DAD-NS message and the DAD-NA message are received and sent in the form of packet. According to the technical solution provided in the embodiments of the present invention, the DAD proxy, after directly detecting that the IP address to be detected is duplicate, directly sends the DAD-NA packet to the subscriber on whom the DAD is performed. The technical solution provided in the present invention greatly reduces the time for the subscriber sending the DAD-NA packet to receive the DAD-NA packet.

Specifically, the process of sending the DAD-NA message to the subscriber on whom the DAD is performed includes:

sending the DAD-NA message to the subscriber on whom the DAD is performed by using an intermediate Layer 2 network.

Further the sending the DAD-NA message to the subscriber for whom the DAD is performed by using an intermediate Layer 2 network includes the details as follows:

the DAD-NA message includes the access location information, i.e., access loop identifier, corresponding to the subscriber on whom the DAD is performed; the access loop identifier may also include the network identifier of the intermediate Layer 2 network.

The DAD proxy sends the DAD-NA message to the intermediate Layer 2 network so that the intermediate Layer 2 network determines whether the DAD-NA message includes the network identifier of the intermediate Layer 2 network; if the DAD-NA message includes the network identifier of the intermediate Layer 2 network, sends the DAD-NA message to the subscriber corresponding to a line identifier in the access loop identifier; otherwise, discards the DAD-NA message, that is, the DAD-NA message is not forwarded.

To ensure that information to be received by the subscriber is more concise, before the DAD-NA message is sent, the access loop identifier may be removed from the DAD-NA message.

It should be noted that if the line identifiers of subscriber connections on the entire network are not duplicated, i.e., each subscriber has a unique line identifier, the access loop identifier may not include the network identifier; if the line identifiers of multiple subscriber connections on the entire network are duplicate, the access loop identifier includes the network identifier so that the subscriber may obtain the DAD-NA message quickly.

The DAD-NA message may also be sent to the subscriber, according to the link layer address of the subscriber on whom the DAD is performed.

206: Determine that the IP address to be detected included in the obtained address information is not duplicate.

Further, after it is determined that the IP address to be detected included in the obtained address information is not duplicate, the method further includes:

updating the address information of the subscriber on whom the DAD is performed and/or the access location information corresponding to the address information in the locally stored DAD information.

207: The IP address to be detected is available after it is determined that the IP address to be detected included in the obtained address information is not duplicate.

Further, after it is determined that the IP address to be detected is not duplicate, the method further includes:

locally storing the address information and the access location information corresponding to the access information that are included in the DAD-NA message.

In this embodiment, a nomadic subscriber is a subscriber who is connected to line 1 and then moves onto line 2. After the subscriber moves nomadically onto line 2, the access location information included in the locally stored DAD information is the information about line 1 of the subscriber, and information about line 2 where the subscribe moves is not stored. According to this embodiment, after the obtained DAD-NS message is compared with the locally stored DAD information, the comparison result indicates that the IP address to be detected and the link layer address are the same, but the access location information is different, an unreachability detection is performed on the locally stored DAD information. If the unreachability detection fails, the locally stored DAD information is updated. After the update, the access location information of the subscriber includes the information about line 2. In this case, automatic address configuration may be implemented.

The Method May Further Include:

maintaining the locally stored DAD information, initiating an unreachability detection to the address information of each subscriber at regular intervals; if the subscriber corresponding to the address information makes a response, retaining the address information; if the subscriber corresponding to the address information makes no response, which indicates that the subscriber is out of service, deleting the address information.

The unreachability detection performed here is the same as that described in the above embodiment.

The DAD proxy may be located on an IP edge device, i.e., the first Layer 3 node on the network, such as BRAS, NAS, BAS. The DAD proxy may also be located on the intermediate Layer 2 network.

The beneficial effects of this embodiment are as follows:

The obtained DAD-NS message is compared with the locally stored DAD information to determine whether the IP address to be detected is duplicate. If the IP address to be detected may be duplicate, the DAD proxy initiates a unicast unreachability detection to determine that the IP address to be detected is duplicate; if the IP address to be detected is duplicate, the DAD proxy sends a DAD-NA message to the subscriber on whom the DAD is performed. In this manner, the DAD may be performed correctly, and also the DAD does not need to forward the multicast packet. This solves the problem related to resource wasting and prolonged delay that are caused by unconditional forwarding DAD-NS message in multicast mode and prevents the case where other subscribers obtain the address information and other related information of the subscriber and conduct malicious attacks after the DAD-NS multicast packet is forwarded to other subscribers. Therefore, information security is improved for the subscriber.

In addition, when the subscriber moves nomadically to another region, the DAD may still be performed by updating the access location information of the nomadic subscriber. Therefore, automatic address configuration may be implemented. Further, the range where the DAD-NA is forwarded may be limited according to the network identifier and the line identifier that are in the access loop identifier. In this manner, the subscriber on a line and network that do not have the network identifier and the line identifier may not obtain the DAD-NA message, which prevents the situation that an unauthorized subscriber conducts malicious attacks after obtaining relevant information by eavesdropping the DAD-NA message within an access range.

Embodiment 3

Figure 4:
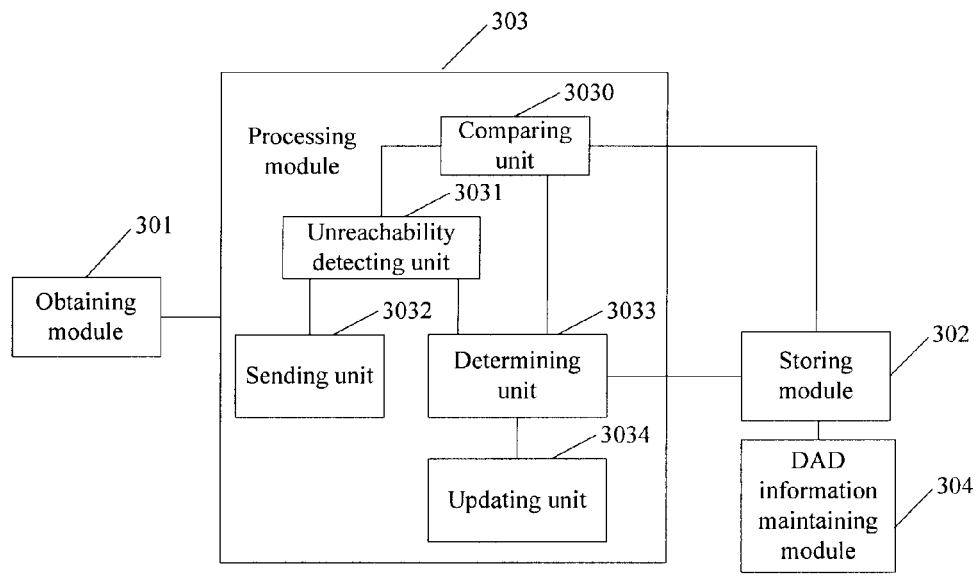
FIG. 4 is a schematic structural diagram of an apparatus of DAD proxy according to Embodiment 3 of the present invention.

Referring to FIG. 4, an embodiment of the present invention provides a DAD Proxy device. The device includes: an obtaining module 301, a storing module 302, and a processing module 303.

The obtaining module 301 is configured to obtain a DAD-NS message, where the DAD-NS message includes address information sent by a subscriber and access location information corresponding to the address information, the address information includes at least an IP address to be detected and a link layer address. In this embodiment, the link layer address may be the MAC address but is not limited to the MAC address.

In this embodiment, the subscriber sending the address information may be the subscriber on whom the DAD is performed.

The access location information obtained by the obtaining module 301 may be sent by a subscriber, may be directly stored by the DAD Proxy itself, or may be inserted by the access device corresponding to the subscriber.

The storing module 302 is configured to store DAD information, where the DAD information includes at least address information and access location information of at least one subscriber. The address information of each subscriber includes at least a link layer address and an IP address to be detected. According to this embodiment, the following section uses the case where the address information sent by a subscriber includes a link layer address and an IP address to be detected as an example for detailed description. However, the case where the address information includes a prefix of the IP address to be detected or other information is also included in this embodiment. If other information is included in the address information, processing is required according to actual conditions, but the processing also falls within the idea of the present invention.

The processing module 303 is configured to compare the DAD-NS message obtained by the obtaining module 301 with the DAD information stored in the storing module 302 to determine whether the IP address to be detected is duplicate.

Specifically, the processing module 303 includes: a comparing unit 3030, an unreachability unit 3031, a sending module 3032, a determining unit 3033, and an updating unit 3034.

The comparing unit 3030 is configured to compare the DAD-NS message obtained by the obtaining module 301 with the DAD information stored in the storing module 302.

The unreachability detecting unit 3031 is configured to:

if the comparison result obtained by the comparing unit 3030 indicates that the IP address to be detected and the access location information that are included in the DAD-NS message obtained by the obtaining module 301 are the same as those included in the DAD information stored in the storing module 302, but the link layer address is different, or if the comparison result obtained by the comparing unit 3030 indicates that the IP address to be detected included in the DAD-NS message obtained by the obtaining module 301 is the same as that included in the DAD information stored in the storing module 302, but the access location information and the link layer address are different, or if the comparison result obtained by the comparing unit 3030 indicates that the link layer address and the IP address to be detected that are included in the DAD-NS message obtained by the obtaining module 301 are the same as those included in the DAD information stored in the storing module 302, initiate, according to the address information included in the locally stored DAD information after comparison, the unreachability detection to the IP address to be detected; if the unreachability detection succeeds, notify a sending unit 3032; if the unreachability detection fails, notify a determining unit 3033.

In this embodiment, the unreachability detecting unit 3031 may include: a first encapsulating subunit, a second encapsulating subunit, and a sending subunit.

The first encapsulating subunit is configured to perform unicast encapsulation on an NS packet according to IP address to be detected included in the DAD information after comparison and form an IPv6 packet.

The second encapsulating subunit is configured to perform, according to a MAC address corresponding to the IP address to be detected included in the DAD information after comparison, link layer encapsulation on the IPv6 packet that is encapsulated by the first encapsulating subunit.

The sending subunit is configured to send, in unicast mode, the IPv6 packet that is link-layer encapsulated by the second encapsulating subunit to the subscriber corresponding to the IP address to be detected, and wait for the subscriber to return an NA packet; if an NA packet is received within a preset time, i.e., the IP address to be detected is reachable, notify the sending unit 3032; if no NA packet is received within the preset time, i.e., the IP address to be detected is unreachable, notify the determining unit 3033.

The sending unit 3032 is configured to, after receiving an unreachability detection success message of the unreachability detection unit 3021, determine that the IP address to be detected is duplicate, and send a DAD-NA message to the subscriber on whom the DAD is performed. The DAD-NA message includes access location information of the subscriber and/or link layer address of the subscriber.

In practice, the DAD-NS message and the DAD-NA message are received and sent in the format of packet. According to the technical solution provided in the embodiments of the present invention, the DAD proxy, after detecting that the IP address to be detected is duplicate, directly sends the DAD-NA packet to the subscriber on whom the DAD is performed. Therefore, the technical solution provided in the present invention greatly reduces the time for the subscriber sending the DAD-NA packet to receive the DAD-NA packet.

The determining unit 3033 is configured to, after receiving an unreachability detection failure message from the unreachability detecting unit 3031, determine that the IP address to be detected included in the address information obtained by the obtaining module 301.

Further, the processing module 303 includes: an updating unit 3034, configured to update, in the locally stored DAD information, the address information of the subscriber on whom the DAD is performed and/or the access location information corresponding to the address information that are stored in the storing module 302, after the determining unit 3033 determines that the IP address to be detected included in the address information obtained by the obtaining module 301 is not duplicate.

In this embodiment, when the comparison result obtained by the comparing unit 3030 indicates that the link layer address and the IP address to be detected that are included in the DAD-NS message obtained by the obtaining module 301 are the same as those included in the DAD information stored in the storing module 302, but the access location information is different, the subscriber on whom the DAD is performed is a nomadic subscriber. A nomadic subscriber is a subscriber who is connected to line 1 and then moves onto line 2. After the subscriber moves nomadically onto line 2, the storing module 302 stores information about line 1 of the subscriber, and information about line 2 where the subscribe moves is not stored. According to this embodiment, when the comparison result indicates that the IP address to be detected and the link layer address that are included in the DAD-NS message obtained by the obtaining module 301 are the same as those included in the DAD information stored in the storing module 302, but the access location information is different, the unreachability detecting unit 3031 performs an unreachability detection on the locally stored DAD information. If the unreachability detection fails, the locally stored DAD information of the subscriber is updated. After the update, the access location information of the subscriber includes the information about line 2. In this case, the DAD may be performed on the subscriber, and therefore automatic address configuration may be implemented.

The determining unit 3033 of the processing module 303 is further configured to: if the comparison result obtained by the comparing unit 3030 indicates that the link layer address and the access location information that are included in the DAD-NS message obtained by the obtaining module 301 are the same as those included in the DAD information stored in the storing module 302, but the IP address to be detected is different, or if the comparison result obtained by the comparing unit 3030 indicates that the access location information included in the DAD-NS message obtained by the obtaining module 301 is the same as that included in the DAD information stored in the storing module 302, but the link layer address and the IP address to be detected are different, or if the comparison result obtained by the comparing unit 3030 indicates that the link layer address included in the DAD-NS message obtained by the obtaining module 301 is the same as that included in the DAD information stored in the storing module 302, but the access location information and the IP address to be detected are different, or if the comparison result obtained by the comparing unit 3030 indicates that the access location information, the link layer address, and the IP address to be detected that are included in the DAD-NS message obtained by the obtaining module 301 are different from those included in the DAD information stored in the storing module 302, determine that the IP address to be detected included in the DAD-NS message obtained by the obtaining module 301 is not duplicate, which indicates that the IP address to be detected included in the DAN-NS message is available.

Further, the storing module 302 is configured to locally store the address information and the access location information corresponding to the address information included in obtained DAS-NS message.

Further, the apparatus may include: a DAD information maintaining module 304, configured to maintain the DAD information stored in the storing module 302, initiate the unreachability detection to the address information of each subscriber at regular intervals; if an NA returned by the subscriber corresponding to the address information is received within a preset time, retain the address information; if no NA returned by the subscriber corresponding to the address information is received within the preset time, i.e., the subscriber is out of service, delete the address information.

The beneficial effects of this embodiment are as follows:

The obtained DAD-NS message is compared with the locally stored DAD information to determine whether the IP address to be detected is duplicate. If the IP address to be detected may be duplicate, the DAD proxy initiates a unicast unreachability detection. After the unreachability detection, it is determined whether the IP address to be detected is duplicate; if the IP address to be detected is duplicate, the DAD proxy directly sends a DAD-NA message to the subscriber on whom the DAD is performed. In this manner, the DAD may be performed correctly and also the DAD does not need to forward the multicast packet. This solves the problem related to resource wasting and prolonged delay that are caused by unconditional forwarding a DAD-NS message in multicast mode and prevents the case where other subscribers obtain the address information and other related information of the subscriber and conduct malicious attacks after the DAD-NS multicast packet is forwarded to other subscribers. Therefore, information security is improved for the subscriber. In addition, when the subscriber moves nomadically to another region, the DAD may be performed by updating the access location information of the nomadic subscriber. Therefore, automatic address configuration may be implemented.

Embodiment 4

Figure 5:
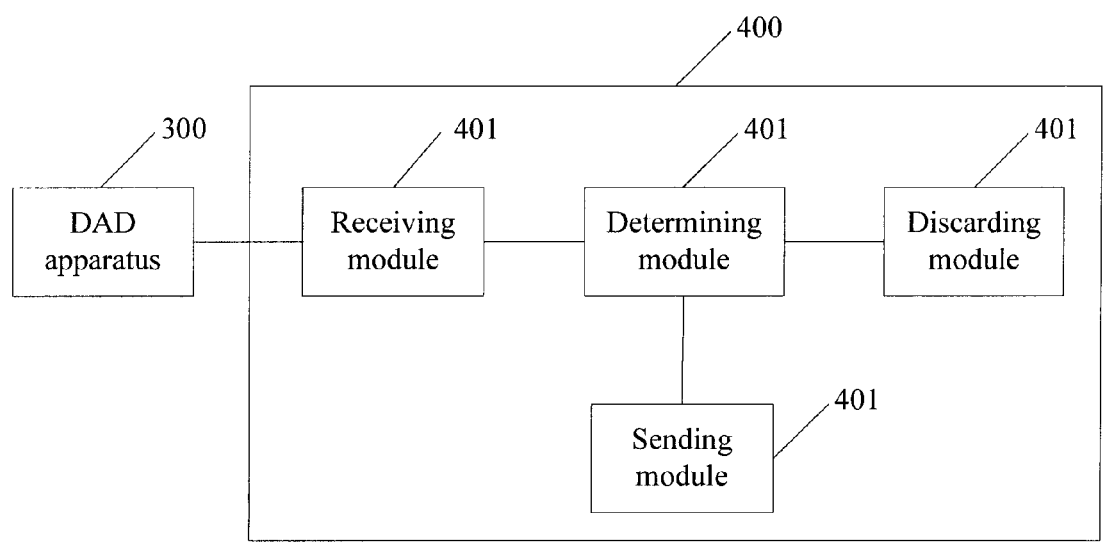
FIG. 5 is a schematic structural diagram of a system of DAD proxy according to Embodiment 4 of the present invention.

Referring to FIG. 5, an embodiment of the present invention provides a system of DAD proxy, where the system includes: a DAD apparatus 300 and an access device 400.

The DAD apparatus 300 is the same as the apparatus provided in Embodiment 3, which is not detailed here.

In this embodiment, the obtaining module 301 is specifically configured to obtain an DAD-NS message by using the access device 400, where the DAD-NS message includes address information sent by a subscriber and access location information corresponding to the address information inserted by the access device 400, the address information includes at least an IP address to be detected and a link layer address.

The access device includes: a receiving module 401, and a determining module 402, a sending module 403, and a discarding module 404.

The receiving module 401 is configured to receive the DAD-NA message sent by the device provided in Embodiment 3, where the DAD-NA message includes an access loop identifier corresponding to the subscriber on whom the DAD is performed, the access loop identifier including an access device identifier and a line identifier;

The determining module 402 is configured to determine whether the access loop identifier in the DAD-NA message received by the receiving module 401 includes the access device identifier of the receiving module 401 itself; if the access loop identifier included in the DAD-NA message includes the access device identifier of the receiving module 401, notify the sending module 403; otherwise, notify the discarding module 404.

The sending module 403 is configured to, according to a line identifier in the access loop identifier, send the DAD-NA message to the subscriber on whom the DAD is performed; and To ensure that information to be received by the subscriber is more concise, before sending the DAD-NA message, the sending module 403 may remove the access loop identifier from the DAD-NA message.

The discarding module 404 is configured to discard the DAD-NA message.

It should be noted that if the line identifiers of subscriber connections on the entire network are not duplicate, i.e., each subscriber has a unique line identifier, the access loop identifier may not include the network identifier; if line identifiers of multiple subscriber connections on the entire network are duplicate, the access loop identifier includes the network identifier so that the subscriber may obtain the DAD-NA message quickly.

The sending module 403 may also send, to the subscriber, the DAD-NA message according to the link layer address of the subscriber on whom the DAD is performed.

The beneficial effects of this embodiment are as follows:
The obtained DAD-NA message is checked to determine whether the access loop identifier included in the DAD-NA message includes the identifier of the access device. If the identifier of the access device is included, the DAD-NA message is forwarded according to the line identifier in the access loop identifier to limit the range where the DAD-NA is forwarded. In this manner, the subscriber on the line and network that do not have the identifier of the access device and line identifier may not obtained the DAD-NA message, which prevents the situation that an unauthorized subscriber conducts malicious attacks after eavesdropping the DAD-NA message within an access range.

In conclusion, the above are merely exemplary embodiments of the present invention. The scope of the present invention is not limited thereto. Variations, replacements, or improvements made without departing from the spirit and principle of the present invention shall fall within the protection scope of the present invention.

The embodiments of the present invention may be implemented by using software or programs. The programs may be stored in a computer readable storage medium, such as: a hard disk, cache, or compact disk-read only memory (CD-ROM).

What is claimed is:

1. A method of duplicate address detection (DAD) proxy, the method comprising:
   obtaining a DAD-neighbor solicitation (DAD-NS) message, the DAD-NS message comprising address information sent by a subscriber and access location information corresponding to the address information, wherein the address information comprises at least an IP address to be detected and a link layer address;
   comparing an obtained DAD-NS message with locally stored DAD information, and adding the DAD-NS message to the locally stored DAD information when it is determined, according to a comparison result, that the IP address to be detected is not duplicate; when it cannot be determined, according to a comparison result, whether the IP address to be detected is duplicate or not, initiating, according to the address information comprised in the locally stored DAD information after comparison, an unreachability detection to the IP address to be detected to determine whether the IP address to be detected is duplicate, wherein the DAD information comprises address information and access location information of at least one subscriber;
   wherein when it cannot be determined, according to a comparison result, whether the IP address to be detected is duplicate or not, the initiating, according to the address information comprised in the locally stored DAD information after comparison, an unreachability detection to the IP address to be detected to determine whether the IP address to be detected is duplicate comprises:
if the comparison result indicates that the IP address to be detected and the access location information comprised in the obtained DAD-NS message are the same as those comprised in the DAD information, but the link layer address is different, or if the comparison result indicates that the IP address to be detected comprised in the obtained DAD-NS message is the same as that comprised in the DAD information, but the access location information and the link layer address are different, or if the comparison result indicates that the link layer address and the IP address to be detected that are comprised in the obtained DAD-NS message are the same as those comprised in the DAD information, but the access location information is different, initiating, according to the address information comprised in the locally stored DAD information after comparison, the unreachability detection to the IP address to be detected to determine whether the IP address to be detected is duplicate; if the unreachability detection succeeds, determining that the IP address to be detected is duplicate and sending a DAD-neighbor advertisement (DAD-NA) message to the subscriber; if the unreachability detection fails, determining that the IP address to be detected is not duplicate.

2. The method according to claim 1, wherein the address information in the DAD-NS message further comprises information of a prefix of the IP address to be detected.

3. The method according to claim 1, further comprising:
performing no operation if the comparison result indicates that the link layer address, the IP address to be detected, and the access location information comprised in the DAD-NS message are the same as those comprised in the DAD information.

4. The method according to claim 1, wherein after determining the IP address to be detected is not duplicate, the method further comprises:
updating, in the locally stored DAD information, address information of the subscriber and/or access location information corresponding to the address information.

5. The method according to claim 1, wherein determining, according to the comparison result, that the IP address to be detected is not duplicate comprises:
if the comparison result indicates that the link layer address and the access location information comprised in the obtained DAD-NS message are the same as those comprised in the DAD information, but the IP address to be detected is different, or if the comparison result indicates that the access location information comprised in the obtained DAD-NS message is the same as that comprised in the DAD information, but the link layer address and the address to be detected are different, or if the comparison result indicates that the link layer address comprised in the obtained DAD-NS message is the same as that comprised in the DAD information, but the access location information and the IP address to be detected is different, or if the comparison result indicates that the access location information, the link layer address, and the IP address to be detected that are comprised in the obtained DAD-NS message are different from those comprised in the DAD information, determining that the IP address to be detected is not duplicate.

6. The method according to claim 1, wherein the access location information is an access loop identifier, the access loop identifier comprising a network identifier and a subscriber line identifier.

7. The method according to claim 6, wherein obtaining a DAD-neighbor solicitation (DAD-NS) message, the DAD-NS message comprising address information sent by a subscriber and access location information corresponding to the address information, comprises:
obtaining the DAD-NS message by using an intermediate Layer 2 network, the DAD-NA message comprising the address information sent by the subscriber and access location information that is inserted by the intermediate Layer 2 network and is corresponding to the address information.

8. The method according to claim 7, wherein the DAD-NA message comprises the access loop identifier corresponding to the subscriber;
the sending the DAD-NA message to the subscriber comprises:
sending the DAD-NA message to the subscriber by using the intermediate Layer 2 network; specifically:
sending the DAD-NA message to the intermediate Layer 2 network, determining, by the intermediate Layer 2 network, whether the DAD-NA message comprises a network identifier of the intermediate Layer 2 network; if the DAD-NA message comprises the network identifier of the intermediate Layer 2 network, sending the DAD-NA message to a corresponding subscriber according to a line identifier in the access loop identifier; otherwise, discarding the DAD-NA message.

9. A method of duplicate address detection (DAD) proxy, the method comprising:
obtaining a DAD-neighbor solicitation (DAD-NS) message, the DAD-NS message comprising address information sent by a subscriber and access location information corresponding to the address information, wherein the address information comprises at least an IP address to be detected and a link layer address;

comparing an obtained DAD-NS message with locally stored DAD information, and adding the DAD-NS message to the locally stored DAD information when it is determined, according to a comparison result, that the IP address to be detected is not duplicate; when it cannot be determined, according to a comparison result, whether the IP address to be detected is duplicate or not, initiating, according to the address information comprised in the locally stored DAD information after comparison, an unreachability detection to the IP address to be detected to determine whether the IP address to be detected is duplicate, wherein the DAD information comprises address information and access location information of at least one subscriber;

wherein initiating, according to the address information comprised in the locally stored DAD information after, an unreachability detection to the IP address to be detected to determine whether the IP address to be detected is duplicate comprises:
performing unicast encapsulation on an NS packet by using the IP address to be detected comprised in the locally stored DAD information after comparison, performing, by using a media access control (MAC) address comprised in the locally stored DAD information after comparison, link layer encapsulation on the neighbor solicitation (NS) packet that is encapsulated in unicast mode, and sending an encapsulated NS packet to the subscriber corresponding to the IP address to be detected; if a neighbor advertisement (NA) packet returned by the subscriber is received within a preset time, determining that the IP address to be detected is duplicate; if no NA packet returned by the subscriber is received within the preset time, determining that the IP address to be detected is not duplicate.

10. The method according to claim 1, further comprising: maintaining the locally stored DAD information, initiating the unreachability detection to the address information of each subscriber at regular intervals; if the subscriber corresponding to the address information makes a response, retaining the address information; if the subscriber corresponding to the address information makes no response, deleting the address information.

11. An apparatus of duplicate address detection (DAD) proxy, comprising: an obtaining module, a storing module, and a processing module; wherein the obtaining module is configured to obtain a DAD-neighbor solicitation (DAD-NS) message, wherein the DAD-NS message comprises address information sent by a subscriber and access location information corresponding to the address information, the address information comprising at least an IP address to be detected and a link layer address;

the storing module is configured to store DAD information, the DAD information comprising address information and access location information of at least one subscriber; and the processing module is configured to compare an obtained DAD-NS message with locally stored DAD information, and add the DAD-NS message to the locally stored DAD information when it is determined, according to a comparison result, that the IP address to be detected is not duplicate; when it cannot be determined whether the IP address to be detected is duplicate or not, initiate, according to the address information comprised in the locally stored DAD information after comparison, an unreachability detection to the IP address to be detected to determine whether the IP address to be detected is duplicate;

wherein the processing module comprises:
a comparing unit, configured to compare the obtained DAD-NS message with DAD information stored in the storing module;
an unreachability detecting unit, configured to:
if the comparison result obtained by the comparing unit indicates that the IP address to be detected and the access location information that are comprised in the DAD-NS message obtained by the obtaining module are the same as those comprised in the DAD information stored in the storing module, but the link layer address is different, or
if the comparison result obtained by the comparing unit indicates that the IP address to be detected comprised in the DAD-NS message is the same as that comprised in the DAD information stored in the storing module, but the access location information and the link layer address are different, or
if the comparison result obtained by the comparing unit indicates that the link layer address and the IP address to be detected that are comprised in the DAD-NS message are the same as those comprised in the DAD information stored in the storing module, initiate, according to the address information comprised in the locally stored DAD information after comparison, the unreachability detection to the IP address to be detected; if the unreachability detection succeeds, notify a sending unit; if the unreachability detection fails, notify a determining unit;
wherein the sending unit is configured to determine that the IP address to be detected is duplicate after receiving an unreachability detection success message from the unreachability detecting unit, and send a DAD-neighbor advertisement (DAD-NA) message to the subscriber; and
wherein the determining unit is configured to determine that the IP address to be detected is not duplicate after receiving an unreachability detection failure message from the unreachability detecting unit.

12. The apparatus according to claim 11, wherein the obtaining module is specifically configured to obtain the DAD-NS message by using an access device, the DAD-NS message comprising the address information sent by the subscriber and access location information that is inserted by the access device and is corresponding to the address information; wherein the address information comprises at least the IP address to be detected and the link layer address.

13. The apparatus according to claim 11, wherein the address information in the DAD-NS message further comprises information of a prefix of the IP address to be detected.

14. The apparatus according to claim 11, wherein the processing module further comprises: an updating unit, configured to update the address information of the subscriber and/or the access location information corresponding to the address information after the determining unit determines that the IP address to be detected is not duplicate.

15. The apparatus according to claim 12, the determining unit is further configured to:
if the comparison result obtained by the comparing unit indicates that the link layer address and the access location information that are comprised in the DAD-NS message obtained by the obtaining module are the same as those comprised in the DAD information stored in the storing module, but the IP address to be detected is different, or
if the comparison result obtained by the comparing unit indicates that the access location information comprised in the DAD-NS message is the same as that comprised in the DAD information stored in the storing module, but the link layer address and the IP address to be detected are different, or
if the comparison result obtained by the comparing unit indicates that the link layer address comprised in the DAD-NS message is the same as that comprised in the DAD information stored in the storing module, but the access location information and the IP address to be detected is different, or
if the comparison result obtained by the comparing unit indicates that the access location information, the link layer address, and the IP address to be detected that are comprised in the DAD-NS message are different from those comprised in the DAD information stored in the storing module,
determine that the IP address to be detected is not duplicate.

16. The apparatus according to claim 15, wherein the unreachability detecting module comprises:
a first encapsulating subunit, configured to perform unicast encapsulation on an neighbor solicitation (NS) packet according to an IP address to be detected comprised in the DAD information after comparison and form an Internet Protocol version 6 (IPv6) packet;

a second encapsulating subunit, configured to perform, according to a media access control (MAC) address corresponding to the IP address to be detected comprised in the DAD information after comparison, link layer encapsulation on the IPv6 packet that is encapsulated by the first encapsulating subunit; and a sending subunit, configured to send, in unicast mode, the IPv6 packet that is link-layer encapsulated by the second encapsulating subunit to the subscriber corresponding to the IP address to be detected, and wait for the subscriber to return a neighbor advertisement (NA) packet; if an NA packet is received within a preset time, notify the sending unit; if no NA packet is received within the preset time, notify the determining unit.

17. The apparatus according to claim 11, further comprising:

a DAD information maintaining module, configured to maintain the locally stored DAD information, initiate the unreachability detection to the address information of each subscriber at regular intervals; if the subscriber corresponding to the address information makes a response, retain the address information; if the subscriber corresponding to the address information makes no response, delete the address information.

18. A system of duplicate address detection (DAD) proxy, comprising: an apparatus of DAD proxy and an access device; wherein the apparatus of DAD proxy comprises: an obtaining module, a storing module, and a processing module; wherein the obtaining module is configured to obtain a DAD-neighbor solicitation (DAD-NS) message by using the access device, wherein the DAD-NS message comprises address information sent by a subscriber and access location information corresponding to the address information inserted by the access device, the address information comprises at least an IP address to be detected and a link layer address;

a storing module, configured to store DAD information, the DAD information comprising address information and access location information of at least one subscriber;

the processing module is configured to compare an obtained DAD-NS message with locally stored DAD information, and add the DAD-NS message to the locally stored DAD information when it is determined, according to a comparison result, that the IP address to be detected is not duplicate; when it cannot be determined whether the IP address to be detected is duplicate or not, initiate, according to the address information comprised in the locally stored DAD information after comparison, an unreachability detection to the IP address to be detected to determine whether the IP address to be detected is duplicate;

wherein the processing module comprises:

a comparing unit, configured to compare the obtained DAD-NS message with the DAD information stored in the storing module;

an unreachability detecting unit, configured to:
if the comparison result indicates that the IP address to be detected and the access location information comprised in the DAD-NS message are the same as those comprised in the DAD information, but the link layer address is different, or
if the comparison result obtained by the comparing unit indicates that the IP address to be detected comprised in the DAD-NS message is the same as that comprised in the DAD information stored in the storing module, but the access location information and the link layer address are different, or
if the comparison result obtained by the comparing unit indicates that the link layer address and the IP address to be detected comprised in the DAD-NS message are the same as those comprised in the DAD information stored in the storing module, initiate, according to the address information comprised in the locally stored DAD information after comparison, the unreachability detection to the IP address to be detected; if the unreachability detection succeeds, notify a sending unit; if the unreachability detection fails, notify a determining unit; wherein the sending unit is configured to determine that the IP address to be detected is duplicate after receiving an unreachability detection success message from the unreachability detecting unit, and send a DAD-neighbor advertisement (DAD-NA) message to the subscriber by using the access device; and the determining unit is configured to determine that the IP address to be detected is not duplicate after receiving an unreachability detection failure message from the unreachability detecting unit;

the access device comprises: a receiving module, and a determining module, a sending module, and a discarding module; wherein the receiving module is configured to receive the DAD-NA message sent by the sending unit in the processing module of the apparatus of DAD proxy, wherein the DAD-NA message comprises an access loop identifier corresponding to the subscriber, the access loop identifier comprising an access device identifier and a line identifier that are corresponding to the subscriber;

the determining module is configured to determine whether the access loop identifier comprised in the DAD-NA message received by the receiving module comprises the access device identifier of the receiving module; if the access loop identifier comprised in the DAD-NA message comprises the access device identifier of the receiving module, notify the sending module; otherwise, notify the discarding module;

the sending module is configured to send the DAD-NA message to the subscriber according to a line identifier in the access loop identifier; and the discarding module is configured to discard the DAD-NA message.

* * * * *